United States Patent [19]
Wieking et al.

[11] 4,077,799
[45] Mar. 7, 1978

[54] METHOD AND APPARATUS OF REFINING CRUDE CADMIUM

[75] Inventors: Hans Wilhelm Wieking; Karl Ehlers, both of Goslar, Germany

[73] Assignee: Preussag Aktiengesellschaft Metall, Goslar, Germany

[21] Appl. No.: 747,301

[22] Filed: Dec. 3, 1976

Related U.S. Application Data

[63] Continuation of Ser. No. 521,886, Nov. 7, 1974, abandoned.

[30] Foreign Application Priority Data

Apr. 13, 1974 Germany ............................ 2418170

[51] Int. Cl.² ............................................. C22B 17/00
[52] U.S. Cl. ............................................. 75/71; 75/63; 266/149
[58] Field of Search ...................... 75/71, 63; 266/149

[56] References Cited

U.S. PATENT DOCUMENTS

| 3,080,227 | 3/1963 | Woods et al. | 75/71 |
| 3,449,116 | 6/1969 | Derham | 75/71 |

FOREIGN PATENT DOCUMENTS 404,032  7/1968  Australia .............................. 266/149

Primary Examiner—M. J. Andrews
Attorney, Agent, or Firm—Toren, McGeady and Stanger

[57] ABSTRACT

A method of refining crude cadmium by vacuum distillation in which crude cadmium is passed into a reflux condenser in which higher boiling point impurities are condensed together with a portion of pure cadmium vapor, this condensate flowing in counterflow with the crude cadmium vapor. The remaining portion of the pure cadmium vapor is subsequently condensed. The apparatus comprises an inverted U-shaped vacuum chamber having an evaporator and a reflux condenser in one leg and a further condenser in the other leg. A feed pipe for liquid crude cadmium enters the one leg adjacent the evaporator and a residue outlet pipe leaves the one leg, the feed pipe and the residue pipe being arranged so that no back-flow takes place from the residue pipe to the feed pipe. An outlet pipe for the refined cadmium issues from the other leg of the vacuum chamber.

1 Claim, 1 Drawing Figure

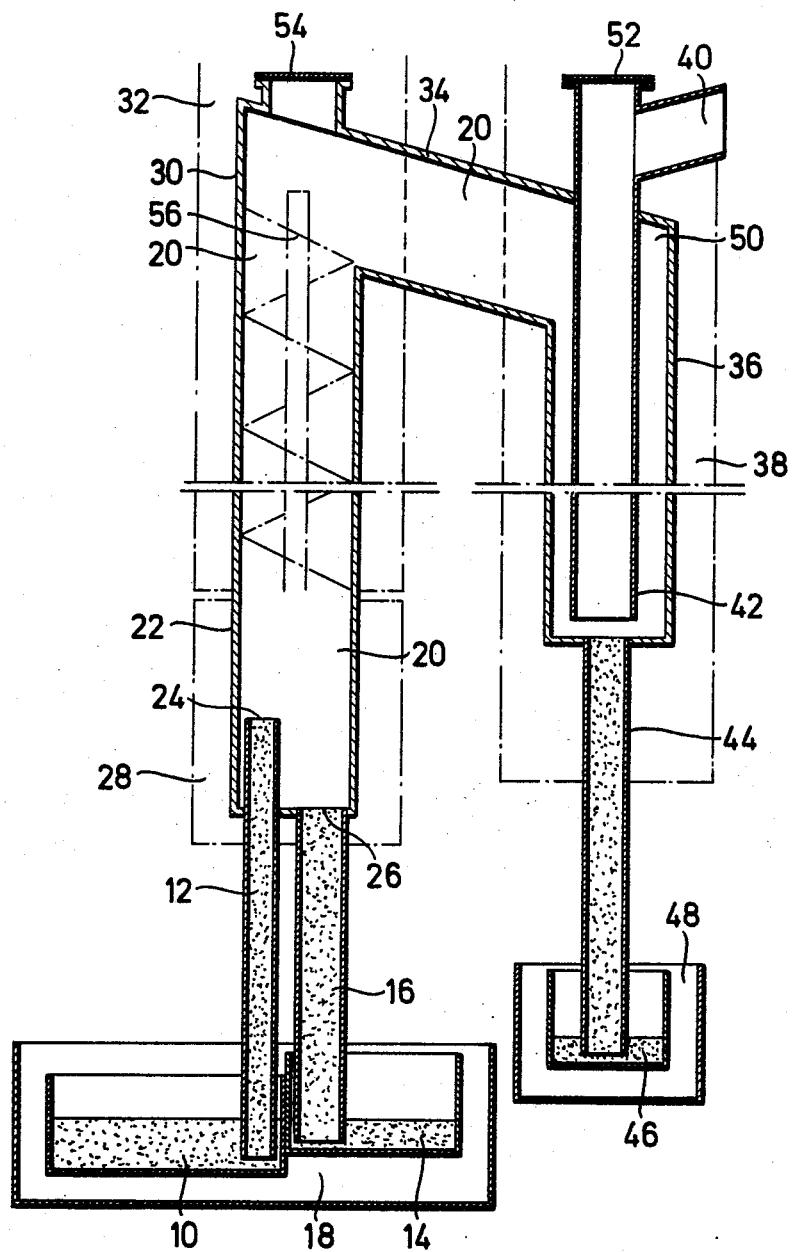

METHOD AND APPARATUS OF REFINING CRUDE CADMIUM

This is a continuation of application Ser. No. 521,886, filed Nov. 7, 1974 now abandoned.

This invention relates to a method of, and an apparatus for, refining crude cadmium, in which liquid crude cadmium enters a vacuum or sub-atmospheric pressure chamber, evaporates there and, after condensing, leaves as refined cadmium.

Crude cadmium which occurs, for instance, as a by-product of zinc production contains various impurities, predominantly lead and thallium and, in smaller proportions, copper and zinc. Using various refining methods it is possible to reduce the proportions of lead and thallium in the cadmium, which frequently considerably exceed 1%, to less than 0.1%, a further reduction of the other impurities taking place at the same time.

Refining methods known in cadmium production are, firstly an electrolytic refinement using consumable or non-consumable anodes; secondly a distillation of the crude cadmium in a Faber-Du-Faure furnace; and, thirdly, a refining of zinc-rich crude cadmium from the refining plants of muffle furnaces in Krokowski columns. Whereas in the first method, the thallium and also a large part of the zinc must be removed in stages of solution clarification, it is necessary in the second, very simple distillation method, for the distillate to be subsequently subjected to an ammonium chloride refining, in order to reduce the high proportion of the thallium still present after distillation. In this method however, from 5 to 7% of the cadmium passes over as cadmium chloride into the slag, from which the cadmium is again recovered by washing, cementation, briquetting, smelting, distillation and refining. In the third method using refining in Krokowski columns, the principle of fractional distillation is used and extremely pure cadmium is obtained, but some residual quantities of zinc still have to be removed from the distilled cadmium.

It is only recently that the refining of crude cadmium by vacuum distillation has been proposed. The melting point of cadmium is 321° C and the vapour pressure of cadmium ranges from 3 to 50 Torr between 400° and 550° C, thus vacuum distillation can be carried out at relatively favourable temperature and pressure values. An apparatus operating according to this principle is described in Australian patent specification No. 404032, by which a distilled cadmium is produced between temperatures of 450° to 460° and a pressure of 0.03 Torr, this cadmium contains a proportion of 0.004% lead, 0.002% zinc and less than 0.001% thallium. In this apparatus, crude cadmium produced as a by-product of zinc smelting is fed into a vacuum chamber, through which it flows once or several times under gravity in an inclined trough leaving an undistilled residue at another location. A portion of the crude cadmium evaporates during the sojourn in the vacuum chamber and condenses on its walls and leaves through a distillate outlet. To improve the efficiency of distillation, it has also been proposed that the crude cadmium is caused to flow over uneven portions, to increase the evaporation surface as a result of its unsettled and turbulent motion. Only a proportion of the crude cadmium introduced into the chamber is effectively converted into refined cadmium in this known apparatus and a residue of undistilled cadmium always remains. This leads to a very limited throughput of cadmium so that using this known device it is only possible for up to about 1,100 kg of cadmium to be produced per day. An increase in the throughput is not possible without reducing the quality, for instance, at a value of 1,300 kg per day an undesired increase in the lead content to 0.01% occurs. This known apparatus is therefore not practical where large throughputs, a reduction in cadmium losses, inexpensive equipment and economic maintenance and operation are of importance.

The problem underlying this invention is therefore to create an apparatus of the type which operates by vacuum distillation, and which, while it avoids the disadvantages referred to, makes possible a simple and economic construction of apparatus and an efficient recovery of high purity cadmium with a large daily output.

According to this invention a method of refining crude cadmium comprises continuously evaporating liquid crude cadmium under a vacuum, passing the vaporised crude cadmium through a reflux condenser in which the impurities having a higher boiling point than cadmium are condensed together with a portion of pure cadmium vapour, the condensate moving in counter-flow with the crude cadmium vapour and subsequently condensing the remaining portion of the pure cadmium vapour.

According to a further aspect of this invention an apparatus for the vacuum distillation of cadmium comprises an inverted U-shaped vacuum chamber having a first leg and a second leg joined by a transition portion, the first leg including an evaporator, a reflux condenser, a feed pipe for the crude cadmium issuing into the first leg adjacent the evaporator, and a rejection pipe for distillation residue, the feed pipe and the rejection pipe being arranged so that, in use, no back flow takes place from the rejection pipe to the feed pipe, the transition portion joining the reflux condenser to a further condenser in the second leg, and an outlet pipe leading from the second leg for the refined cadmium.

An apparatus of this type is comparatively simple and makes it possible effectively to obtain refined cadium of higher purity with an increased throughput. The crude cadmium accumulating in the evaporator passes into the reflux condenser, in which a portion of the evaporated cadmium and substantially all the impurities condense and return to the evaporator thus rectifying the ascending cadmium vapour. The result is an improved purity of the distillate passing into the further condenser, so that even with high throughput rates a refined cadmium of high purity is obtained depending upon the temperatures at which the process is carried out. The refined cadmium passes throgh the outlet into a receiver.

In contrast with the previously known method, a liquid crude cadmium flow is not passed through the entire vacuum chamber, and it has been found that the operation including evaporation followed by reflux cooling leads to a more favourable result. Also with the apparatus according to this invention there is no undistilled cadmium issuing from the vacuum chamber, which according to the previously known method sometimes had to be re-cycled several times through the vacuum chamber. Thus in a single operation both very pure refined cadmium and also a concentrated distillation residue are obtained, and these flow separately into a receiver for the distillate and into a collecting vessel for the distillation residue. Provided there is a suitable supply of crude cadmium, and the refined cadmium and the distillation residue are removed, the apparatus according to the invention can be operated continuously, which leads to a considerable saving in personnel costs compared with the previously known methods of refining crude cadmium.

In a preferred form of apparatus the feed pipe, the discharge pipe and the rejection pipe are immersed in liquid baths of raw cadmium, refined cadmium and distillation residue respectively and extend to a height above the surface of the relevant bath which at least corresponds to the barometric height of the associated bath at the temperature of that bath; the open end of the feed pipe being higher than the open end of the rejection pipe. After the temperatures have been adjusted in the various parts of the apparatus and a vacuum has been established in the chamber the crude cadmium, the refined cadmium and the distillation residue are sucked into the feed pipe, the discharge pipe and the rejection pipe to their respective barometric heights. After these barometric levels have been reached, evaporation of the cadmium commences and the cadmium which evaporates from the feed pipe is made up continuously by sucking up more crude cadmium from the smelting vessel. The separate baths and the parts of the apparatus connected to the baths through the different barometric columns enable an absolutely continuous refining process to be carried out in a simple and suitable manner. Since there is a difference in level between the open ends of the feed pipe and of the rejection pipe, it is possible always to maintain an in-fed of the crude cadmium, without it being possible for the distillation residue to flow back from the collecting vessel into the feed pipe.

In a practical form of apparatus, the feed pipe, the discharge pipe and the rejection pipe are connected to the lowermost free ends of the two legs of the vacuum chamber and a vacuum pipe arranged to be connected to a source of vacuum extends downwards along the second leg of the chamber to a point just above the lowermost point of the further condenser. This arrangement has proved especially suitable as the entire length of the U-shaped chamber is effectively used for the vacuum distillation. In the first leg of the chamber, evaporation, reflux condensation, partial cooling and rectification take place, whereas the true condensation and output of the distillate are concentrated into the second leg, which is traversed by the vacuum pipe in order to improve the condensation. The vacuum connection could indeed be provided in another manner and at another position, but this multiple utilisation in regard to a vacuum connection and an increase in condensation surface area leads to a favourable overall performance of the apparatus. Because the vacuum pipe is led down into the region just above the lowermost point in the further condenser, blockages caused by cadmium precipitations are avoided.

Furthermore, the vacuum pipe in the further condenser preferably possesses the largest diameter whilst still leaving a sufficient annular space around it to allow the cadmium vapour to enter the further condenser. This results in a still further increase in the condensation area, so that an increase in the throughput rate is sometimes possible without additional measures.

Moreover, the transition portion between the two legs may be inclined to the horizontal and slope towards the second leg. A partial condensation takes place in the reflux condenser and in the transition portion so that this arrangement allows an unrestricted flow of the condensate into the further condenser. This also results in a favourable influence upon the entire functioning of the apparatus in regard to an increased production of cadmium.

Preferably the evaporator and the reflux condenser include a heating jacket, while a jacket of the further condenser can be independently heated or cooled. Whereas the temperatures in the evaporator and in the reflux condenser must be maintained within certain ranges, depending upon the throughput, the temperature in the further condenser is largely dependent upon the quantity of condensing cadmium, because the heat required for evaporation is again released on condensation. In operation, a temperature equilibrium becomes established in the further condenser, as a function of condensation heat of the distillate and of the heat loss through its walls. Depending upon the particular operating requirements, an additional external heating or cooling may be provided of the further condenser, for the purpose of influencing the condensation performance. It is moreover very advantageous for the evaporator to be fitted with a temperature regulator so that the entire performance of the apparatus and thus the throughput of cadmium may be controlled. It is however advantageous, especially in the case of a fairly large temperature difference in the evaporator, if all or some of the other temperatures in the apparatus can be modified within certain limits, so that the apparatus always functions under optimum operating conditions.

It has also been found advantageous for the temperatures in the smelting vessel for crude cadmium and in the collecting vessel for distillation residue to be slightly below the temperature in the evaporator. In this way it is possible to prevent an excessive temperature shock from occurring when crude cadmium is introduced from the smelting vessel or when distillation residue flows back from the collecting vessel into the evaporator.

For an effective partial condensation and rectification to take place in the first leg of the U-shaped chamber, the temperature in the reflux condenser should be somewhat below that in the evaporator. Whereas a too small temperature difference between the evaporator and the reflux condenser only leads to inadequate rectification, a too high a temperature difference results in excessive partial condensation within the first leg, so that the entire throughput of the apparatus is reduced.

In a practical example it has been found beneficial with an evaporator performance rated at about 72 g/cm$^2$/hour, to adjust the temperature of the evaporator to about 485° C, the smelting vessel and the collector vessel to about 455° C, the peak of the reflux condenser to about 420° C and the receiver to about 420° C. This results in a temperature difference of about 30° C between the evaporator and the crude cadmium which avoids thermal shock, and a temperature difference between the evaporator and the reflux condenser of a maximum of 65° C. For other throughput rates obtained by changing the temperature in the evaporator, at least the temperatures in the smelting vessel and collector vessel should be modified to prevent temperature shock and that in the reflux condenser modified to obtain most favourable partial condensation in this region.

Since it is possible in efficient vacuum distillation of cadmium to maintain relatively low temperatures, it is possible, having regard to the boiling curves for cadmium, lead, thallium and copper as a function of air pressure and the compatibility of these materials with iron, for the U-shaped chamber and/or the feed line, rejection line and discharge line to be manufactured from iron or steel. It is thus possible for the entire apparatus to be manufactured very economically without the use of expensive materials.

A method of, and an apparatus for, refining crude cadmium will now be described with reference to the accompanying drawing which is a diagrammatic cross-section through the refining apparatus.

The refining apparatus essentially comprises an inverted U-tube shaped vacuum chamber 20. The two depending legs of the chamber have different end closures. A feed pipe 12 dips into a smelting vessel 10 for crude liquid cadmium and leads into the first leg of the chamber 20. A rejection pipe 16, which dips into a collecting vessel 14 for the distillation residue also leads into this first leg. In practice the distillation residue is usually a lead-thallium alloy. Open ends 24 and 26 of the feed pipe 12 and the rejection pipe 16 are arranged at different levels, the feed pipe 12 penetrating further into the first leg of the vacuum chamber 20. The smelting vessel 10 and the collecting vessel 14 are surrounded by a common heater 18 which maintains them at the same temperature. The heating of the crude cadmium in the smelting vessel 10 and of the distillation residue in the collecting vessel 14 may of course be carried out independently.

The feed pipe 12 and rejection pipe 16 lead directly into an evaporator portion 22 of the chamber 20 and the evaporator includes a heating jacket 28 which controls the temperature according to the required throughput of cadmium. The evaporator portion 22 leads into a reflux condenser portion 30 which is also situated in the first leg of the chamber. The condenser 30 is surrounded by a jacket 32 by means of which the temperature in the reflux condenser 30 is adjusted so that it is somewhat below the temperature in the evaporator 22 and in use a partial condensation of the previously evaporated cadmium is obtained. The jacket 32 may be heated or cooled to achieve this. The condensate flow in the reflux condenser 30 flows in counter-current to the cadmium vapour and back into the evaporator. This refluxing of the condensate has a very favourable influence upon the entire process and causes a rectification or purification of the cadmium to take place.

The outlet from the reflux condenser 30 is connected to a transition pipe 34, which connects together the two legs of the inverted U-tube and is inclined to the horizontal and towards the second leg. Any condensation which occurs in the pipe 34 is thus channelled into a condenser 36, which forms the second leg of the U-tube or vacuum chamber 20.

The condenser 36 has a jacket 38, which may be heated or cooled as required. An upper vacuum connection 40 leads to a vacuum pump which is not shown, and a vacuum tube 42 extends into the condenser 36 and terminates above the lowest point of the condenser 36. The vacuum tube 42 connects the vacuum chamber 20 to the vacuum pump and also increases the condensation area in the condenser 36. To obtain the greatest condensation area, the diameter of the vacuum tube 42 may be relatively large, provided that there is a sufficient annular space 50 between the vacuum tube 42 and the wall of the vacuum chamber 20.

A discharge pipe 44 for the refined cadmium is connected into the free end of the second leg of the chamber 20 or the condenser 36, the refined cadmium is collected in a receiver 46, which is equipped with a heater 48 to maintain the refined cadmium at the desired temperature.

At the ends of the first and second legs adjacent the transition pipe 34, closures 52 and 54 are provided which permit access into the interior of the vacuum chamber 20. The closures 52 and 54 may include transparent and temperature-stable inspection windows.

The smelting vessel 10, the collecting vessel 14 and the receiver 46 serve as barometric locks for the apparatus and the heights of the open ends of the feed pipe 12, the rejection pipe 16 and the discharge pipe 44 above their respective bath surface levels must be at least equal to the barometric height of the associated bath.

It has been found that the cross-sectional areas of the feed pipe 12 and the discharge pipe 44 have no or only a marginal influence upon the operation of the apparatus. By contrast, the cross-sectional area of the rejection pipe 16 for the distillation residue must not be less than the cross-sectional area of the evaporator 22 by more than a certain degree. The rejection pipe 16 serves as a buffer and thus must be able to accommodate a feed of crude cadmium into the evaporator. The rejection line must have a sufficient volume so that it prevents the crude cadmium entering the collecting vessel 14 when crude cadmium is introduced through the feed pipe 12 into the evaporator. The crude cadmium is introduced through the smelting vessel 10 and the feed pipe 12 into the evaporator 22, this may be carried out intermittently, for example once hourly, and a pressure equilibrium is established between the evaporator 22 and the collecting vessel 14. In this equilibrium a portion of the crude cadmium flows into the rejection pipe 16 until the weight of the introduced charge of crude cadmium is supported by the barometric pressure as the crude cadmium flows from the open end of the pipe 12 into the pipe 16, a corresponding portion of the distillation residue is forced out of the pipe 16 into the collecting vessel 14. The crude cadmium situated in the top of the rejection pipe 16 serves as a reserve or buffer and as cadmium is evaporated in the evaporator this reserve of crude cadmium is fed back into the evaporator to compensate for the reduction in volume caused by evaporation. This simultaneously causes the residue in the collecting vessel 14 to flow back into the rejection pipe 16. Consequently, the cross-section, and hence the volume of the rejection pipe 16 must be sufficient to accommodate a charge of crude cadmium.

In operation, the temperatures of the evaporator 22, the reflux condenser 30 and the condenser 36 may be adjusted by igniting burners, while the smelting vessel 10, the collector vessel 14 and the receiver 46 are at suitable temperatures. These temperatures should be selected to avoid a temperature shock happening in the evaporator 22, thus the temperature of the crude cadmium and the distillation residue are only a little lower than that of the evaporator 22. To improve the performance of the apparatus, a screw or helix baffle 56 may be incorporated into the reflux condenser 30, which retards the direct ascent of the cadmium vapour and produces a rotation of the cadmium vapour and thus ensures a better contact of the vapour with the cold wall of the reflux condenser. The condensation conditions are substantially improved in this way.

After a vacuum has been established in the vacuum chamber 20, the cadmium evaporates in the evaporator 22 and passes into the reflux condenser 30, where a portion of the evaporated cadmium and substantially all of the impurities condense and flow back in counter-current to the cadmium vapour in the evaporator 22. Thus a rectification of the ascending cadmium vapours thus takes place and only cadmium vapour passes through the transition pipe 34 into the condenser 36 in the other leg of the U-pipe, where they are subjected to a more intense condensation. The resulting condensate or distillate is very pure refined cadmium, which is conducted through the discharge pipe 44 into the receiver 46.

The vacuum distillation apparatus according to the invention makes possible very efficient production of cadmium with high throughput rates and a high degree of purity in the refined cadmium, as can be seen from the following examples.

EXAMPLE 1

In a first research stage, more than 40,000 kg of cadmium were refined using an apparatus in accordance with the invention at a throughput of approximately 750 kg per day to a degree of purity of 99.998% Cd. In doing this, the following temperatures were set or achieved in the apparatus: 420° C in the smelting vessel 10 for the crude cadmium and in the receiver 46 for the refined cadmium; 500° C in the evaporator 22; 500° C in the reflux condenser 30 and 380° C in the condenser 36.

EXAMPLE 2

Using another apparatus in accordance with the invention, more than 200 tonnes of refined cadmium was produced at a throughput of approximately 2,200 kg per day, which corresponds to an evaporator performance rating of 72 g/cm$^2$/hour. The following temperatures were maintained: 455° C in the smelting vessel 10 and collecting vessel 14; 485° C in the evaporator 22; 420° C at the highest point of the reflux condenser 30; and the temperature in the condenser 36 settled at 420° C, while the temperature in the receiver 46 was maintained at 420° C.

Crude cadmium having the following composition was used in both examples:
1.5 to 2.6% lead,
0.015 to 0.8% copper,
0.003 to 0.01% zinc,
0.4 to 1.8% thallium.

In both vacuum distillations, the refined cadmium obtained had a composition of: less than 0.001% lead, 0.002% copper, 0.0001% zinc and 0.001% thallium.

From Example 2 it follows that even at the research stage of the apparatus the degree of purity of the refined cadmium at high throughput rates is much more favourable than with previously known apparatus. Furthermore experiments have shown that a further increase in the rate of throughput is possible, without a deterioration in the quality of the output.

We claim:

1. A method of refining crude cadmium comprising the steps of continuously evaporating liquid crude cadmium under a vacuum, passing said vaporized crude cadmium upwardly through a reflux condenser, condensing impurities having a higher boiling point than cadmium together with a portion of pure cadmium vapor in said reflux condenser, causing the condensate in said reflux condenser to move in counterflow with said crude cadmium vapor, causing the condensed impurities to separate from the condensed crude cadmium and causing the condensed crude cadmium to return to the evaporating crude liquid cadmium, and subsequently condensing the remaining portion of said pure cadmium vapor.

* * * * *